No. 633,230. Patented Sept. 19, 1899.
C. E. COE.
SINGLETREE HOOK.
(Application filed Jan. 19, 1899.)
(No Model.)

WITNESSES:
Odia Wells
Ellen Wells

INVENTOR:
Charles E. Coe,
BY
Semer G. Wells,
ATTORNEY.

UNITED STATES PATENT OFFICE.

CHARLES E. COE, OF ST. LOUIS, MISSOURI, ASSIGNOR TO CHARLES H. SAWYER, JR., OF SAME PLACE.

SINGLETREE-HOOK.

SPECIFICATION forming part of Letters Patent No. 633,230, dated September 19, 1899.

Application filed January 19, 1899. Serial No. 702,649. (No model.)

*To all whom it may concern:*

Be it known that I, CHARLES E. COE, a citizen of the United States, residing in the city of St. Louis and State of Missouri, have invented an Improvement in Singletree-Hooks, of which the following is a specification.

Figure 1:
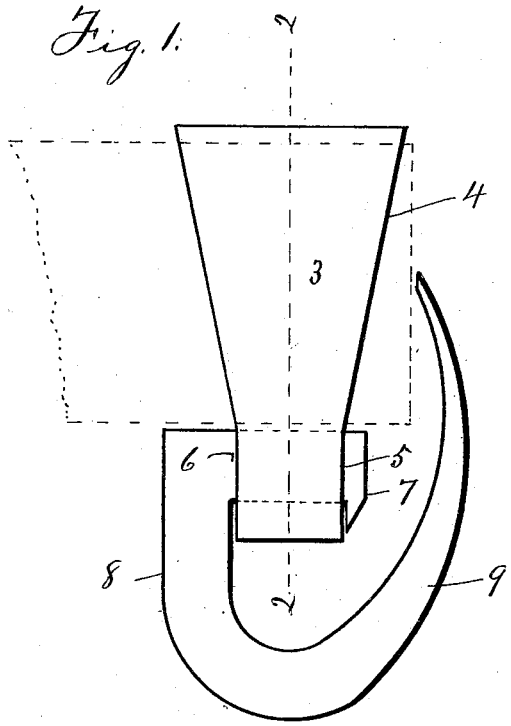
Figure 2:
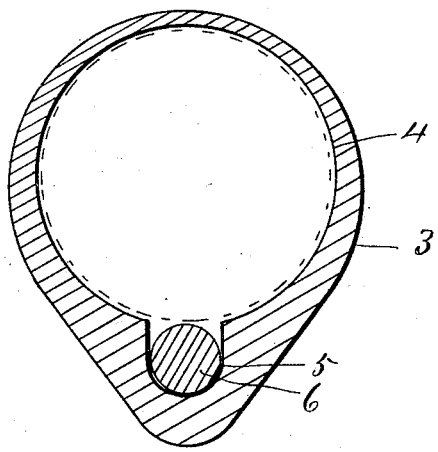

Figure 1 is a plan of my improved singletree-hook, and Fig. 2 is a section on the line 2 2 of Fig. 1.

My object is to construct a singletree-hook which will not become accidentally unhooked while in use and which shall be simple and inexpensive.

My invention consists of a ferrule forming a large bearing to receive the end of the singletree-stick and a smaller bearing at one side of the large bearing and communicating therewith to form part of the hinge-joint, a shaft to engage in said small bearing, a head upon the outer end of said shaft to hold the shaft in the bearing, an arm extending forwardly from the inner end of said shaft, and a hook extending forwardly, outwardly, and backwardly from the forward end of said arm, the free end of said hook being normally near the end face of the singletree-stick.

Referring to the drawings, the ferrule 3 forms the large bearing 4 to receive the end of the singletree-stick, said stick being shown in dotted lines, and the small bearing 5 communicating therewith. The shaft 6 is placed in the bearing 5 before the ferrule is placed upon the stick, and the head 7 holds the shaft in the bearing. The arm 8 extends forwardly from the inner end of the shaft and the hook 9 extends forwardly, outwardly, and backwardly from the forward end of the arm, the free end of said hook being normally near the end face of the singletree-stick. The hinge-joint bends up and down and will not bend in or out. A ring or "cockeye" engaging in the hook cannot be removed while the free end of the hook is in its normal position near the end face of the stick. When it is desired to unhook the ring or cockeye, the hinge must be bent up or down to swing the free end of the hook out of the plane of the stick, and this cannot be done by accident.

The complete device is preferably made in the form of two malleable castings, said castings being interlocked before placing the stick in position.

The invention is not only suitable for the ends of the singletree, but may also be used on the ends of the doubletree to connect it to the singletree.

I claim—

A device of the class described, consisting of the ferrule 3, forming the large bearing 4 and the small bearing 5 communicating with the large bearing; the shaft 6 operating in the bearing 5; the head 7 upon one end of said shaft to hold the shaft in the bearing; the arm 8 extending forwardly from the other end of the shaft; and the hook 9 extending forwardly, outwardly and backwardly from the forward end of said arm, the free end of said hook being normally in line with the center of the large bearing 4, substantially as specified.

CHARLES E. COE.

Witnesses:
EVERETT GRAHAM,
PAUL CARSON.